United States Patent [19]

Gordon

[11] Patent Number: 4,975,728
[45] Date of Patent: Dec. 4, 1990

[54] FLYING SPOT SCANNER-PRINTER

[75] Inventor: Eugene I. Gordon, Summit, N.J.

[73] Assignee: Photon Imaging Corp., Edison, N.J.

[21] Appl. No.: 479,658

[22] Filed: Feb. 8, 1990

[51] Int. Cl.$^5$ ............................................. G03B 27/00
[52] U.S. Cl. .......................................... 355/1; 355/20; 358/200
[58] Field of Search ...................... 355/1, 20; 358/200

[56] References Cited

U.S. PATENT DOCUMENTS

| | | | |
|---|---|---|---|
| 4,674,834 | 6/1987 | Margolin | 355/1 |
| 4,702,552 | 10/1987 | Margolin | 355/1 |
| 4,748,680 | 5/1988 | Margolin | 355/1 |
| 4,760,421 | 7/1988 | Margolin | 355/1 |

*Primary Examiner*—Monroe H. Hayes
*Attorney, Agent, or Firm*—Herbert M. Shapiro

[57] ABSTRACT

A document scanner or printer includes a fiber optic bundle which has the fibers of one end arranged in a linear array and the fibers of the other end arranged in an area array. A CRT, or equivalent device, is coupled to the area array and adopted to generate light in a sequence of positions there. The sequence of positions is determined by an algorithm which organizes the addresses of those positions in a list of consecutive near neighbors. Other embodiments are operative to eliminate from the address sequence any address at which no light is to be generated. By shortening the path that a beam traverses or by eliminating some addresses from the address sequence, improved operating speeds are achieved.

19 Claims, 3 Drawing Sheets

FLYING SPOT SCANNER-PRINTER

FIELD OF THE INVENTION

This invention relates to a flying spot scanner or printer employing a display device such as a cathode ray tube (CRT), or a digitally-addressable display device such as a x-y, matrix-addressed, liquid crystal, light valve and a fiber optic bundle.

BACKGROUND OF THE INVENTION

U.S. Pat. No. 4,760,421 issued July 26, 1988 discloses a printer using a CRT, or CRT equivalent, and a fiber optic bundle. The bundle has first and second faces in which the light-guiding fibers are aligned in a linear array and in an area array respectively. The linear face abuts an electrostatic (electro-photographic) medium and the face plate of the CRT is imaged to the area face of the bundle. The printer includes a permanent memory which stores the digital addresses of electron beam positions on the face plate each of which corresponds to a specific pixel position in the linear face. The beam of the CRT is directed to consecutive ones of those addresses. The phosphor excited into luminescence by the impinging electrons on the face plate, in response, introduces light into a sequence of fibers in the area face. The fibers guide the light to the sequence of pixel positions in the linear face. The light exiting the linear face is operative to selectively discharge the electrostatic medium, pixel by pixel in a manner to create a line image of surface charge or corresponding electrostatic potential variation. The electrostatic medium moves at constant speed or step by step so that the succession of line images produces an area image in a raster fashion. The area image on the electrostatic medium is used to create an image, for example, on plain paper as in the familiar xerographic process.

The sequence of digital addresses for the beam on the face plate and the associated pixel in the linear face is obtained electronically by an initialization procedure which, for example, employs the CRT to move an electron beam in sequential fashion to each of predefined addresses in a dense grid, say 512×512, of positions on the face plate during each complete scan of the face plate. The phosphor responds to generate light at different addresses of the linear face corresponding to the beam addresses. During each complete scan of the face plate, a photodetector, apertured through a narrow slit and moved incrementally along the linear face, senses an output only when the face plate address at which light is generated coincides with a faceplate address position that produces light which is focussed or transmitted into the fiber at which the photodetector is positioned. Generally, there will be many electron beam addresses in a cluster at which light will be transmitted into the fiber. Only one of these need be chosen at the center of the cluster. The initialization procedure is continued until the detector has sensed the presence of light at each pixel position in the linear face and those positions are associated with corresponding optimum face plate addresses of the electron beam.

The sequence of electron beam addresses and the corresponding pixel positions in the linear face established during the initialization procedure is placed in a look up table. The look up table is used, for example, to burn a programmable read only memory (PROM) which is used during normal operation to control the succession of beam positions during production of each linear (line) segment of the image being exposed.

The patent discloses that a magnetic deflection CRT or an electrostatic CRT can be used for such a printer. The scan trajectory described in the patent can be described as a vector scan sequence chosen such that light emerges in a progressive sequence from the fibers in the linear face. The electrostatic CRT is useful in the vector scan mode because changing electric fields rapidly is easier than changing magnetic fields. So high speed or lower power operation is attainable. Although the electrostatic CRT is faster than the magnetic CRT, it is more costly and has other disadvantages. The present invention is directed at minimizing the total trajectory of beam excursions during accessing of the sequence of addresses, thereby mitigating the requirement for high speed operation, thus making the lower cost magnetic CRT more attractive.

BRIEF DESCRIPTION OF ILLUSTRATIVE EMBODIMENTS OF THIS INVENTION

In accordance with the principles of this invention, certain addresses in the address sequence established during an initialization procedure are skipped or they are taken in an order which provides a "shortened" path for the beam to traverse on the face plate. The "skip-pixel" mode is useful in a flying spot printer where, for example, the light prints black and a document is to be printed from electronic memory. The number of black pixels per linear scan line is, on the average, 10% or less of the total number of pixels. The data from memory corresponding to each consecutive scan line is used to identify those black pixels and to select from the original address sequence only those addresses where black pixels occur. In a vector scan mode skipping pixels, the line writing time is reduced (by 90% or more) because the number of pixels addressed is reduced. In this mode, the photosensitive medium is stepped from line to line.

In another embodiment of this invention, the CRT beam follows a roughly horizontal path with small (vertical) excursions which allow it to address all of the fibers. This is called pseudo raster scanning and produces a shortened path. The progressive sequence of light emissions from the linear face of the bundle characteristic of a vector scan mode, no longer occurs. Instead, the sequence of light emissions from the fibers in the linear face are not in any special order. The line input data is reordered according to the look up table so that each fiber produces the proper pixel. The addresses and the input signals for all the fibers are known. The signals are organized according to the data in the look up table so that the proper light pattern impinges (via all the fibers) on the linear segment of the electrostatic medium.

The short path mode also can apply to the skip pixel mode. However, in the skip pixel mode, the address trajectory for each line depends on which pixels are to be written.

In an electro photographic printer it is desirable for the electrostatic medium and all other associated moving media such as the paper to move at constant velocity. A start-stop motion for the drum is possible but is less desirable because coordination of all the moving elements in the process results in a more complex mechanical design. Also, the exposure occurs only when the medium is stationary. The step time is reasonably short and exposure during motion of the electrostatic or the photosensitive medium is undesirable because it causes vertical lengthening (smearing) of the pixel. This vertical smearing occurs in the continuous motion mode if the exposure time is a substantial part of the line time. In a progressive sequence of writing, the successive pixels are each displaced vertically by a small but identical amount compared to the previously written pixel if the medium is moving. There is no vertical displacement if the medium is stationary during exposure. However, for either moving or stationary mode the written pixels fall on a straight line and there is no resulting degradation.

In the short path mode, the time sequence of writing the pixels on a line is not progressive. The order is partially random although it is the same for every written line. When the photosensitive medium is stationary, there is no vertical displacement and all the pixels are written on a straight line. However, when the photosensitive medium is moving, the vertical displacements between successive pixels on the line are not identical. Therefore, the line is not straight. This vertical displacement turns out to cause only an insignificant problem. Although there is no attempt to order the fibers in the area face relative to those in the linear face, it is observed that the opposite ends of fibers which are adjacent in the linear face are usually nearby one another in the area face. Thus, the time interval between writing into adjacent fibers in the short path mode is generally small compared to the time to write the complete line. As a consequence, the vertical displacement between adjacent pixels is generally a small fraction of the pixel height. Therefore, the written line is straight within the ability to observe except by microscopic techniques. Further, the fact that the CRT faceplate has a large number of addresses for each fiber end in the area face of the fiber optic bundle provides a means for compensating for any vertical displacement. The speed advantage for the CRT in accordance with the principles of this invention arises from the recognition that for printing, as for page scanning, there are two main components which determine speed of operation: (1) the time for the electron beam to slew and to settle into a new address position; and (2) the dwell time during which the optical flux is delivered to the electrostatic medium. The dwell time is fixed by the brightness of the CRT, the optical transmission efficiency, and the exposure requirement of the medium. The slew and settle time depend on the path length between addresses. The skip-pixel and short path modes disclosed herein are directed at reducing the total slew and settle time; the skip-pixel mode addresses only pixels where print data indicates black. The length of the path the CRT beam follows on the face plate is reduced in the short path mode. Each mode permits an increase in dwell time for a fixed line time if necessary, because less time is used during each linear segment to access the sequence of addresses. Alternately, the difficulty of slewing and settling a magnetically deflected electron beam is reduced because the incremental angle through which the beam must be slewed is reduced.

The "short path" mode is useful for a document scanner as well as for a printer. In this case, the light impinges on a document and the scattered light is detected, producing the output signal. The look up table allows the output data from the photodetector in the short path mode to be reordered to produce a serial data stream corresponding to the sequential order of the pixels in the linear segment being scanned. The short path mode reduces the time for scanning or printing a linear segment by reducing the total length of the path the beam of the CRT actually traverses on the face plate.

DETAILED DESCRIPTION OF AN ILLUSTRATIVE EMBODIMENT OF THIS INVENTION.

The principles of this invention are applicable to either a document scanner or a printer utilizing a CRT and a fiber optic bundle as described above. Common to such a scanner or printer is a subsystem including, for example, a CRT optically coupled to an area face of the fiber optic bundle wherein the fiber bundle has a linear face also. In the case of a printer, that linear face is coupled to, for example, a continuously moving electrostatic medium as described above. In the case of the scanner, the linear end is coupled to a document and is associated with a photodetector to sense light reflected from or transmitted through the document. The scanner arrangement is disclosed in copending application Ser. No. 325455 filed Mar. 17, 1989 for Eugene Gordon and assigned to the assignee of the present application.

In the case of the scanner or the printer, the fiber optic bundle is (illustratively) noncoherent, there being no predetermined relationship between the position of the end of a given fiber in the linear face and the position of the other end of the fiber in the area face of a bundle. The relationship between the fiber positions in the linear face and the light source addresses is established by an initialization procedure.

The initialization procedure organizes, for example, the pixel data at an exit face of a scanner to correspond to a set of digital X-Y addresses as noted above. The present invention is directed at reducing the time it takes a CRT beam, or the power required, to move to all the addresses in the set on the face plate of the CRT during each period in which a linear segment is scanned (or printed). Because the operation of the subsystem is the same whether a scanner or a printer function is being implemented, and because the invention can be understood in terms of the subsystem alone, the detailed description is rendered only in the context of a printer.

Figure 1:
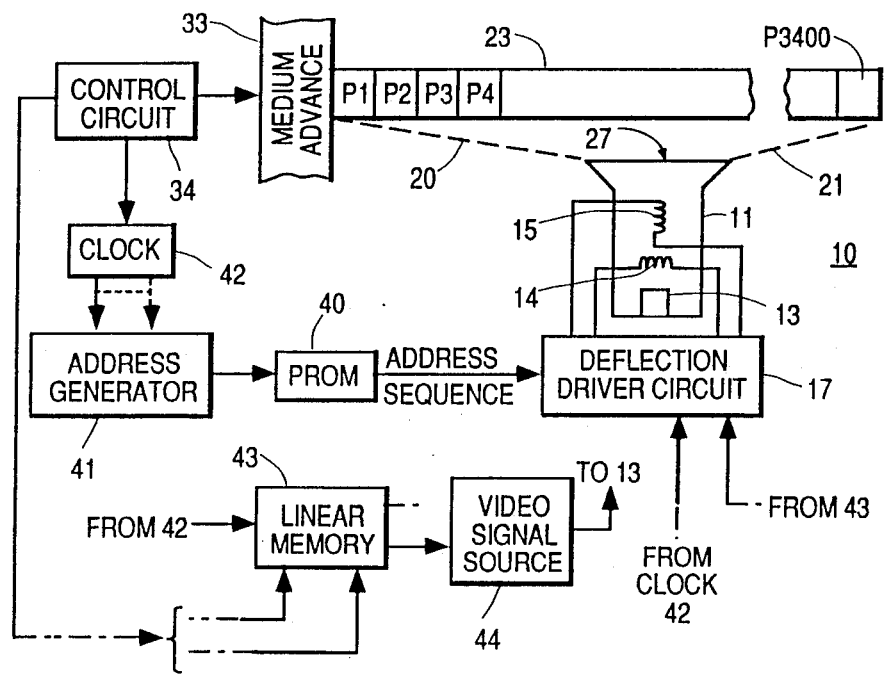
FIG. 1 is a schematic block diagram of a printer in accordance with the principles of this invention.

FIG. 1 shows a printer 10 in accordance with this invention. The printer illustratively includes a magnetic deflection CRT designated 11 in the figure. CRT 11 includes a Cathode and beam focussing electrodes 13 for generating and controlling an electron beam as well as X and Y coils 14 and 15 for deflecting that beam. The X and Y coils are operative, in response to currents applied to the coils by deflection driver circuit 17, normally to direct a focussed beam of electrons incident on the CRT face plate to the succession of positions the addresses of which are stored in the PROM. The presence or absence of electrons at a position of the beam determines whether the phosphor on the inside surface of the face plate emits light or not at the position. Alternatively, an electrostatic deflection CRT can be employed, as disclosed in the above-noted patent to scan the requisite succession of face plate light source addresses.

The light produced by the phosphor at each position of the CRT beam, for which the beam is turned on, enters a corresponding fiber of the fiber optic bundle and emerges from that fiber at the linear face of the bundle. FIG. 1 represents the fiber optic bundle by the broken lines 20 and 21 and represents the linear end of the bundle by broken rectangle 23. Rectangle 23 is shown as including a set of squares designated P1, P2, P3, P4, - - - - P3400 representing pixels (pixel position) 1 through 3400 as seen from left to right in the figure. This number of pixels corresponds to a pixel density of 400 dpi for an 8.5 inch wide line segment.

Figure 2:
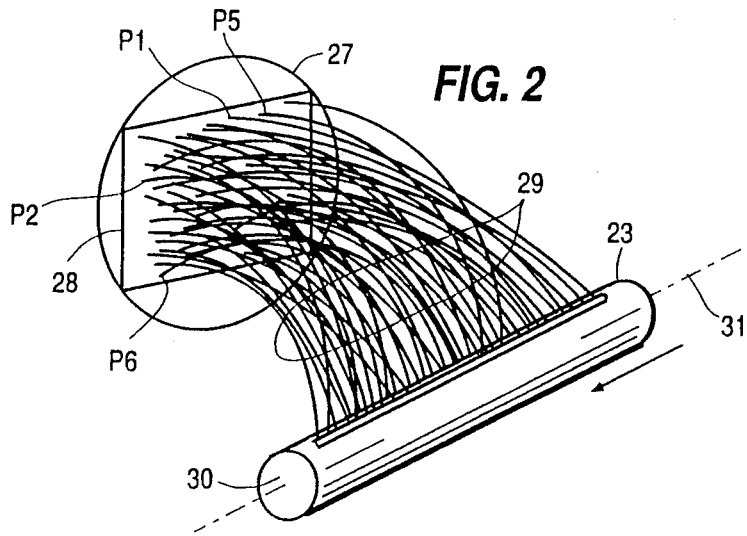
FIG. 2 is a schematic illustration of a fiber optic portion of the printer of FIG. 1.

The actual physical organization of the CRT face plate, the fiber optic bundle and the linear end of the bundle juxtaposed with an electrostatic medium is represented in FIG. 2. The face plate 27 of FIG. 1 is represented as a circle in FIG. 2. The area face of the fiber optic bundle is represented as a square 28 in FIG. 2. The random arrangement of fibers, confined by imaginary tie 29 in FIG. 2, extends from area face 28, which abuts face plate 27, to linear face 23 (see FIG. 1 also) which is optically coupled to the electrostatic medium.

The electrostatic medium is represented by drum 30 in FIG. 2 and is adapted to rotate about axis 31. The electrostatic medium and the development of an image is entirely consistent with well understood xerographic techniques and are not described further herein. Drum 30 is advanced, for example, by a motor drive arrangement represented by block 33 of FIG. 1 designated "medium advance". Control circuit 34 of FIG. 1 controls and synchronizes the movement of drum 30.

Figure 3:
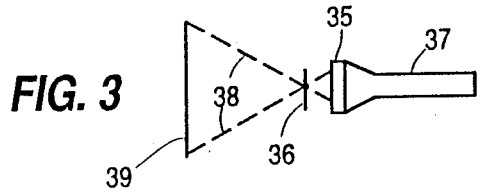
FIG. 3 is a schematic illustration of the optical subsystem of the printer of FIG. 1.

FIG. 3 shows an analogous system in which lenses 35 and 36 image the face plate of CRT 37 onto the area face of a fiber optic bundle 38. The linear end of bundle 38 is designated 39 in FIG. 3.

The determination of the sequence of face plate addresses to which the beam of the CRT is directed is important for unscrambling the pixel data. That sequence of addresses is determined during an initialization procedure as discussed above. The look up table generated during that initialization procedure is used to "burn" a programmable read only memory (PROM) represented by block 40 of FIG. 1.

Figure 4:
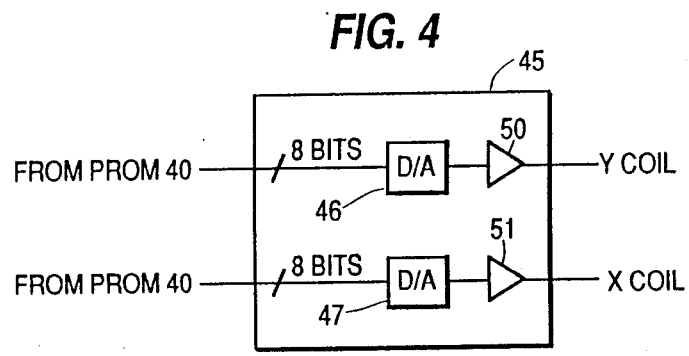
FIG. 4 is a circuit diagram of a portion of the printer of FIG. 1.

The output of PROM 40 is connected to inputs to deflection drive circuit 17 by means of a digital to analog (D/A) converter arrangement 45 shown in FIG. 4. The output of an address generator 41 is connected to the input of PROM 40. An output of a clock 42 is connected to the input of address generator 41. The output of a (linear) buffer memory 43 also is connected to an input to deflection drive circuit 17.

In operation, each clock pulse from clock 42 is operative to increment address generator 41. The address generator scans the, illustrative, 3400 addresses stored in addresses 1 through 3400 of the PROM address field.

The address generator, specifically, applies to PROM 40, a sequence of 3400 addresses for applying to coils 14 and 15, after D to A conversion, the sequence of addresses stored in the PROM addresses (1-3400). Thus, the stored address sequence is generated to organize the light pattern at the face plate to correspond to the desired pattern produced at the linear end of the bundle. Linear memory 43, also connected to clock 42, is a parallel to series memory and has a serial output connected to a video signal source 44. The video signal source is connected to cathode 13 and is operative to apply the CRT beam control (video signal), thus determining whether or not light is generated for each beam position, according to data from memory 43.

Each face plate address is stored in PROM as a set of two eight, nine or ten bit (digital) codes. The (two pairs of) Coils 14 and 15 of FIG. 1 are responsive to currents to deflect the beam of the CRT to the address represented by each code. FIG. 4 shows the D/A converter arrangement 45 for converting each eight bit code from PROM 40 into a pair of currents for proper operation of the coils. The arrangement includes two eight bit D/A converters 46 and 47 the inputs to which are connected to outputs of PROM 40. The converters are followed by amplifiers 50 and 51, respectively, as shown. The outputs of amplifiers 50 and 51 are connected to driver circuit 17 for providing the requisite currents to X and Y deflection coils 14 and 15 respectively.

It is clear that the printer of FIG. 1 (or scanner) is operative because an address sequence controls the consecutive beam positions on the face plate to correspond to the pixel positions in the linear face of the fiber optic bundle. But a brief inspection of FIG. 2 indicates that conceivably a considerable amount of time could pass, for example, between the generation of light for pixel P1 of FIG. 1 and the generation of light for pixel P2 of FIG. 1. Consider, for example, the path the beam of the CRT may be required to traverse to move from the face plate position corresponding to pixel P1 to the position corresponding to pixel P2 or from the position corresponding to pixel P5 to that corresponding to position P6. Adjacent pixels in the linear face of the bundle could very well correspond, and do often correspond to separated positions on the CRT face plate. Thus, the beam trajectory may be torturous and the time required for the beam to move to the consecutive positions of the address sequence may be long thus imposing a constraint on the time required to print a page and on the available dwell time and power requirements of the system.

In accordance with the principles of this invention, the time required for the CRT beam to move through all the addressed positions of the face plate is reduced significantly, allowing an improvement in the time required for the drive power to, for example, print a page. The larger the angle through which the beam must be slewed, the more drive current and the more demanding the requirements on the deflection amplifiers.

Consider, for example, a representative CRT which has a 512×512 address grid. Thus, there are potentially 262,144 addresses but only 3400 are used i.e. about one out of 77 addresses. Thus, along either axis, the next pixel address is about 9 addresses removed per pixel. But because the fiber bundle comprises a random arrangement of fibers, at any given position for the beam of the CRT, the next address if the linear array is scanned sequentially, need not be nearby on the face of the CRT as explained above. The present invention is based on the recognition that although the CRT beam is required to move to all the addresses of the address sequence, it need not move in such a way as to produce a progressive sequence of outputs at the linear face. Therefore, the sequence of addresses chosen can represent a succession of nearest neighbor addresses minimizing the slew angle in going from one address to the next.

The same is true of the scanner. A photodetector arrangement (see copending application No. 325455 above) adjacent the linear face of the fiber optic bundle merely records a sequence of pixel data. The order in which the pixel data occurs (viz: the CRT faceplate address sequence) and the correspondence between that pixel data sequence and the pixel position sequence in the linear face of the fiber optic bundle can be determined by a look up table which relates each successive pixel data output from the photodetector to the corresponding address of the address sequence.

Recognizing that the actual sequence of addresses of an address sequence determined during an initialization procedure can be used to organize the pixel data output of a scanner after the fact, we can address the linear face pixels out of progressive sequence and, therefore, we can access the face plate addresses in the most convenient manner. Thus, we can move from one face plate address to the next nearest face plate address in the address sequence regardless of where that address actually occurs with respect to the linear face pixel position sequence determined during the prior initialization procedure. But all the face plate addresses of the sequence are accessed.

Figure 5:
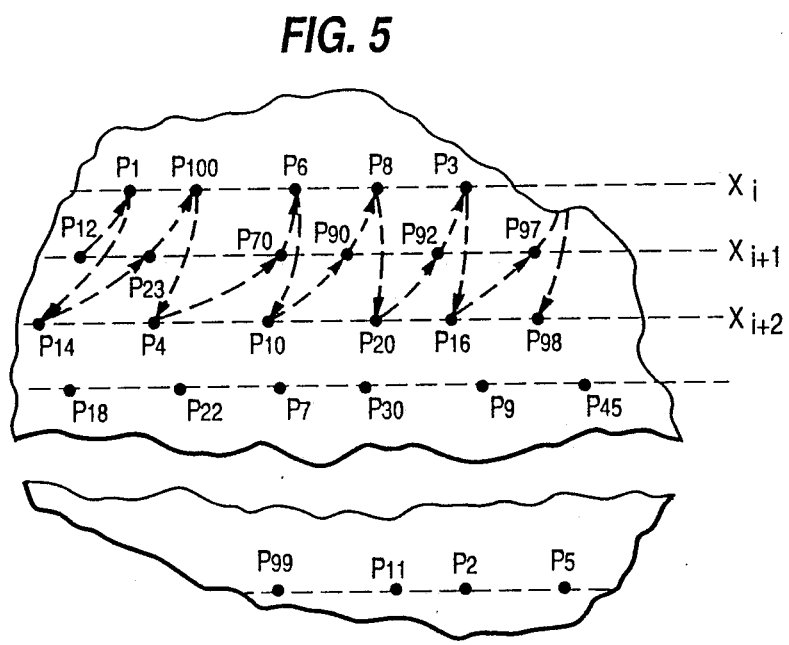
FIG. 5 is a schematic illustration of a representative arrangement of address positions on a CRT faceplate fragment of FIG. 1.

The advantage of moving the CRT beam from one address on the face plate that corresponds to a pixel position to its next nearest neighboring address rather than to the address corresponding to the next pixel position in the linear sequence becomes clear from an inspection of FIG. 5. FIG. 5 represents a fragment of the face plate 27 of FIGS. 1 and 2. The horizontal broken lines may be taken to represent the locus of the address grid elements. The black dots on the scan lines represent actual addresses on the face plate designated by the pixel positions to which they correspond. Thus, pixel P1 of FIG. 1 may correspond to an address at the upper left hand position of the face plate designated P1 in FIG. 5. The next pixel, P2 in FIG. 1, may correspond to the face plate position nearby but not immediately adjacent as seen in FIG. 5. Similarly for P2, P3, P4, P5 etc.

Figure 6:
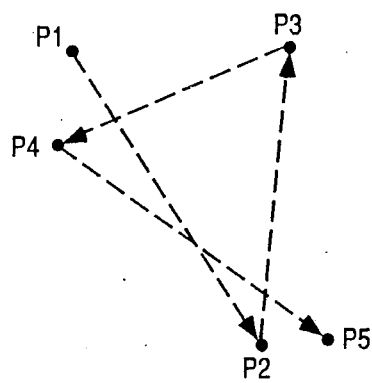
FIG. 6 is a schematic illustration of a beam path on the faceplate of a CRT.

The trajectory for the travelling "spot" on the face plate can be seen to be lengthy as is illustrated by connecting pixels P1, P2, P3, P4 and P5 of FIG. 5 as shown in FIG. 6. FIG. 6 shows the face plate addresses corresponding to pixel (positions) P1, P2, P3, P4 and P5 in the spatial positions in which they occur in FIG. 5. The broken lines between those positions in FIG. 6 represent the travel of the beam on the face plate. On the average, such a torturous travel is repeated for the entire 3400 positions. Fortunately, the beam can be moved quickly so a practical printer or scanner is still possible even in view of such a long journey for the beam during each line segment. Also, fortuitously, FIG. 6 represents an exaggerated spacing of fiber ends to illustrate a point. In practice, such extreme spacings do not occur.

There are many possible algorithms for defining the short path trajectory. One such algorithm comes from recognizing that of the 512×512=262,144 possible address only 3400 correspond to pixels. Thus, there are 77 addresses per pixel on a roughly 9×9 grid. For a given value of Y there are 6–7 pixels along a row, separated by about 80 addresses. Correspondingly, the same statistics apply for a column at fixed X. Each pixel usually has 5 nearest neighbors. It can be seen that the nearest neighbors above and below and to the side are typically separated by a linear distance corresponding to the spacing of no more than 10 addresses. Thus, typically the X address and/or the Y address need change by no more than 10 addresses in going from one pixel to a nearest neighbor. Often the change would be no more than roughly 7 addresses in the X direction and 7 addresses in the Y direction in going from one pixel to the next. This leads to forms of nearest neighbor/second nearest neighbor strategies for minimizing the number of addresses changed in going from one pixel to the next.

For example, assume that the address grid is divided into 16 contiguous bands of rows containing 32 rows each. The roughly 212 pixels in the band are accessed by first identifying the band with the largest values of Y and writing the pixels in that band going from the least value of X to the largest value of X in progressive order until all the 212 pixels in the band are written. Then the pixels in the band with the next highest values of Y are written starting with the largest value of X and moving to progressively lower values. The change in X-address is on average no more than 2-3 units. The change in Y-address is no more than 32 units worst case. Typically, it would be less than 10. Other constraints can be placed that insure that the maximum Y displacement is limited at the expense of allowing slightly larger X-displacements. The consequence would be that the succession of addresses accessed would follow a roughly serpentine path with small horizontal and vertical excursions.

The actual displacement from one address to the next need be usually no more than ±10 address positions in X and Y, thereby, greatly minimizing the slew angle.

Many such algorithms are possible and can be generated by those skilled in the art. The main purpose would be to minimize the X and Y displacements in any one slew motion so as to reduce the complexity and necessary capability of the deflection electronics and to minimize the slew and settle time.

Figure 7:
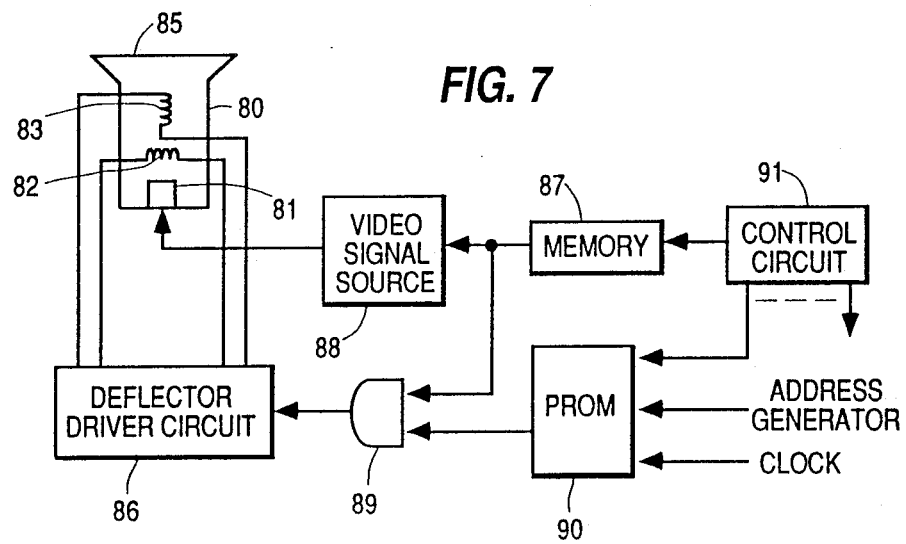
FIG. 7 is a block diagram of an alternative embodiment in accordance with the principles of this invention.

FIG. 7 shows a block diagram of an alternative printer system. The system includes a CRT designated 80. The CRT includes a cathode 81, for generating an electron beam, and coils 82 and 83. The coils are operative, as above, to move the beam to a first sequence of addresses on faceplate 85 determined during a prior initialization procedure. The deflection operation is controlled by current applied to the coils by a D/A converter arrangement much as described above in connection with FIG. 4. The analog signals, in each instance are applied to the coils by deflection drive circuit 86.

The image to be generated by the system of FIG. 7 is stored in memory 87 which corresponds to memory 43 of FIG. 1. Outputs from memory 87 determine whether or not video signal source 88 activates cathode 81 to generate a beam, or not, at each addressed position on faceplate 85.

In accordance with the principles of this invention, the outputs of memory 87 are applied to an AND circuit 89 to which the outputs of PROM 90 are also applied. PROM 90 applies the first sequence of addresses in a manner analogous to that described in connection with FIG. 1. But only a binary one signal from memory 87 enables an address of the address string to be applied to the deflection circuit. By eliminating addresses from the first address sequence during the scanning of each line segment, a reduced second addresses sequence is addressed thus reducing slew time. In the case of the skip pixel embodiment, the reduced second address sequence is generated "on the fly" for each scan segment in response to the video information from memory. Control circuit 91 controls the operation of the various components.

In either embodiment, the skip pixel or the short path, reduced slew time is achieved and magnetic deflection CRT become increasingly attractive as a result. Still, electrostatic CRT's may also benefit from the principles of this invention. The constraints on cost-performance tradeoffs are eased.

It is to be understood that in both the skip pixel and the short path embodiments, an initialization procedure establishes a first address sequence. In both embodiments, that first address sequence is modified. In the skip pixel embodiments, a printer includes, for example, a PROM in which that first sequence is stored to be modified "on the fly" as described. In the short path embodiments, the first address sequence need not be included in the finished product. Instead, the first address sequence may be stored in a look up table. Whether or not the first sequence is included in the finished device, a second look up table is generated, according to the algorithm described, to prepare a PROM which stores the modified, short path, second address sequence. The PROM storing the second address sequence is included in the finished product.

But in either case, a first address sequence is prepared by an initialization procedure. In the case of a skip pixel embodiment, that first sequence has to be stored in memory in the finished device.

In either type of embodiment, the average slew angle for the resulting printer or scanner is an order of magnitude less than would be the case if the first progressive address sequence were used rather than the modified second sequence.

It is to be understood that although the foregoing description has been rendered in terms of black and white images, that color embodiments can be obtained in accordance with the principles of this invention. Color embodiments are achieved, for example, by employing a color wheel (not shown) located between elements 37 and 38 of FIG. 3. Color wheels are well known and are not described at length herein. Suffice it to say that such a wheel is rotated in a manner to provide light of different colors entering the fiber bundle. The use of light of different colors permits color descriptors to be determined during an initialization procedure for providing color information for normal operation of the finished device. Alternatively, different penetration phosphors can be used on the face plate of the CRT for permitting color descriptors to be provided by a time sequential initialization procedure, one for each color, analogous to the initialization procedure described above. The voltages applied to the cathode are different for the different colors. For the time sequential arrangement, three identical initialization procedures are employed, one for each color.

Printer embodiments herein can be adapted for printing directly on light-sensitive paper rather than on an electrostatic drum. Color information can be generated as described at the linear end of a fiber optic bundle optically coupled to consecutive linear segments of a photographic paper. The paper can be of a thermal or mechanical development type or photographic film could be so exposed for later development.

What is claimed is:

1. A flying spot printer comprising a CRT and a fiber optic bundle, said bundle having a linear face and an area face, said linear face being optically coupled to a photo-sensitive medium for defining a linear segment thereon, said CRT having a face plate and being optically coupled to said area face, said printer including first look up table means for storing a sequence of addresses on said face plate to correspond to the pixel sequence at said linear face, said printer also including a memory for storing pixel data for consecutive linear segments of an image to be formed on said medium and means responsive to said pixel data for skipping selected ones of said addresses of said sequence.

2. In combination, a fiber optic bundle having a linear face and an area face, a CRT optically coupled to said area face, said combination including first look up table means for storing a first list of addresses of positions on the face plate of said CRT for organizing pixel data at said face plate to match the organization of pixels in said linear face, said combination also including second look up table means for storing a rearrangement of said first sequence of addresses into a second sequence for reducing the length of the path the beam of said CRT traverses on the face plate in accessing the addresses of said first sequence.

3. A combination in accordance with claim 2 also including means for relating the pixel amplitude associated with each address of said first sequence with the corresponding address of said second address.

4. A method for initializing apparatus comprising a fiber optic bundle having a linear and an area face and a CRT optically coupled to said area face where the linear face end defines a linear segment including a sequence of pixels, said method comprising the steps of sequentially positioning a photodetector at each of incremental positions in said linear face directly opposite each fiber end in such a manner as to detect light coming only from that fiber, moving the beam of the CRT, recording the optimum address for the beam at which the photodetector senses light, incrementing the position of the photodetector, repeating the beam procedure until the beam addresses for all fiber positions are determined forming a first sequence of such addresses corresponding to said sequence of pixels, and forming a second sequence for the addresses of said first sequence, said second sequence reordering said addresses into a list of consecutive near neighbor address positions on said face plate.

5. A combination of elements comprising a cathode ray tube (CRT) and a fiber optic bundle having an array of light-guiding fibers in a first area face, said bundle also having a second face which defines a linear first segment including a linear array of pixels, said CRT having a light output face plate optically coupled to said area face, first means for storing a first sequence of electron beam addresses corresponding to pixels in said linear segment and characterized by a first succession of slew paths from address to address required to scan the succession of electron beam addresses so as to access the pixels in a progressive sequence and produce a sequential line scan and second means for applying to said CRT a second sequence of addresses including only addresses from said first sequence for providing a second succession of slew paths of total length shorter than that of said first succession of slew path.

6. A combination in accordance with claim 5 wherein said second means includes memory means for storing said second address sequence and means for applying the addresses of said second sequence to said CRT during successive ones of said linear segments.

7. A combination in accordance with claim 6 wherein said memory means comprises a programmable read only memory for outputting said second sequence, and said CRT includes means responsive to each address of said second sequence for selectively generating light at the corresponding position on said face plate.

8. A combination in accordance with claim 5 also including memory means for storing patterns of binary ones and zeros representative of the pixels along successive linear segments of an image to be printed and means responsive to said pattern for skipping electron beam addresses of said first sequence corresponding to pixels for which binary zeros are stored.

9. A combination in accordance with claim 5 wherein said first means comprises a look up table stored in a computer memory and is used to program a read only memory storing said second address sequence for application to said CRT.

10. Apparatus comprising means for generating light at each of selected addresses in an area array of addresses of a field, optical path means comprising a plurality of light paths constrained to area and linear faces at first and second ends thereof respectively, said field being optically coupled to said area face, said apparatus also including means for storing a second sequence of addresses, said second sequence including only addresses selected from a first sequence of addresses determined during an initialization procedure to correspond to the sequence of pixels in said linear face, said second sequence being organized such that each address therein is physically a closely spaced address in said field with respect to the next preceding address of said sequence.

11. Apparatus in accordance with claim 10 wherein said means for generating light comprises a CRT and said plurality of light pipes comprises a fiber optic bundle.

12. Apparatus in accordance with claim 11 in which said CRT includes a faceplate and an associated field of addresses, a source of a controllable current electron beam, and deflection means for moving said beam to a succession of addresses on said faceplate, said apparatus also including means for applying said second sequence of addresses to said deflection means.

13. Apparatus in accordance with claim 10 wherein said linear face is optically coupled to an electrostatic medium, said apparatus including means for moving said medium from linear segment to linear segment and means for applying said second sequence of addresses to said means for generating light for each of said linear segments.

14. Apparatus in accordance with claim 11 wherein said linear face is optically coupled to an electrostatic medium, said apparatus including means for moving said medium from linear segment to linear segment, and means for applying said second sequence of addresses to said CRT for each of said linear segments.

15. Apparatus in accordance with claim 10 including a photodetector associated with said linear face, said photodetector being operative to sense light reflected or scattered from a document optically coupled to said linear face, and means for applying said second sequence of addresses to said means for generating light for each of said linear segments.

16. Apparatus in accordance with claim 11 including a photodetector associated with said linear face, said photodetector being operative to sense light reflected or scattered from a document optically coupled to said linear face, and means for applying said second sequence of addresses to said CRT for each of said linear segments.

17. Apparatus comprising means for generating light at each of selected addresses in an array of addresses of a field, optical path means comprising a plurality of light paths constrained to linear and area faces at first and second ends thereof respectively, said field being optically coupled to said area face, said apparatus also including means for storing a first sequence of addresses determined during an initialization procedure to correspond to a sequence of light paths and associated pixels in said linear face, memory means for storing pixel data for pixels at said linear face, signal processing means responsive to said pixel data for determining the presence or absence of light at each of said addresses, and means for skipping addresses of said first sequence of addresses responsive to said pixel data.

18. Apparatus in accordance with claim 17 wherein said means for generating light comprises a CRT and said plurality of light pipes comprises a fiber optic bundle.

19. Apparatus in accordance with claim 18 wherein said linear face is optically coupled to an electrostatic medium, said apparatus also including means for moving said medium from linear segment to linear segment, wherein said means for skipping addresses of said first sequence is responsive to pixel data for each of said linear segments.

* * * * *